United States Patent

[11] 3,595,079

[72] Inventor Allen R. Grahn
 Chicago, Ill.
[21] Appl. No. 682,355
[22] Filed Nov. 13, 1967
[45] Patented July 27, 1971
[73] Assignee Northwestern University
 Evanston, Ill.

[54] FLUID FLOW VELOCITY MEASURING APPARATUS
 11 Claims, 10 Drawing Figs.

[52] U.S. Cl. ................................................. 73/204,
 73/3
[51] Int. Cl. ................................................. G01f 1/00
[50] Field of Search .......................................... 73/204;
 128/2.05 F

[56] References Cited
 UNITED STATES PATENTS

| | | | |
|---|---|---|---|
| 2,892,347 | 6/1959 | Laprand | 73/204 |
| 3,075,515 | 1/1963 | Richards | 73/204 X |
| 3,405,708 | 10/1968 | Webster | 73/204 X |
| 3,438,253 | 4/1969 | Kuether et al. | 73/204 |

Primary Examiner—James J. Gill
Attorney—Johnson, Dienner, Emrich, Verbeck and Wagner ABSTRACT: Apparatus for measuring instantaneous fluid flow velocity including a probe having fluid flow velocity, temperature and direction sensor thermistors selectively positioned thereon. The sensor thermistors are connected in an electrical circuit including bridge circuits adapted to compensate for changes in temperature of the fluid being measured. The circuit establishes an output signal proportional to the flow velocity of the fluid and having a polarity dependent upon the direction of fluid flow. The circuit further computes the acceleration, mean velocity and peak velocity of fluid flow. The measuring apparatus is calibrated by a calibrator having a piston-cylinder arrangement adapted to effect predetermined fluid flow through a flow conduit which supports the probe such that its sensor thermistors are disposed within the flow stream. The calibrator includes a potentiometer circuit operative to establish an electrical signal proportional to the velocity of fluid flow past the probe sensors. The output signal of the measuring apparatus may then be compared to the signal produced by the calibrator potentiometer circuit and the measuring apparatus adjusted to bring the signals into desired phase and magnitude relation.

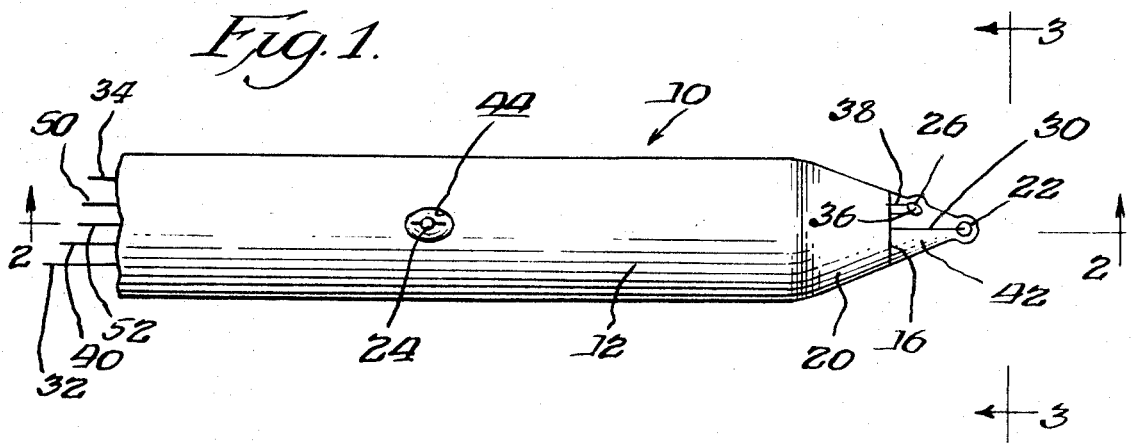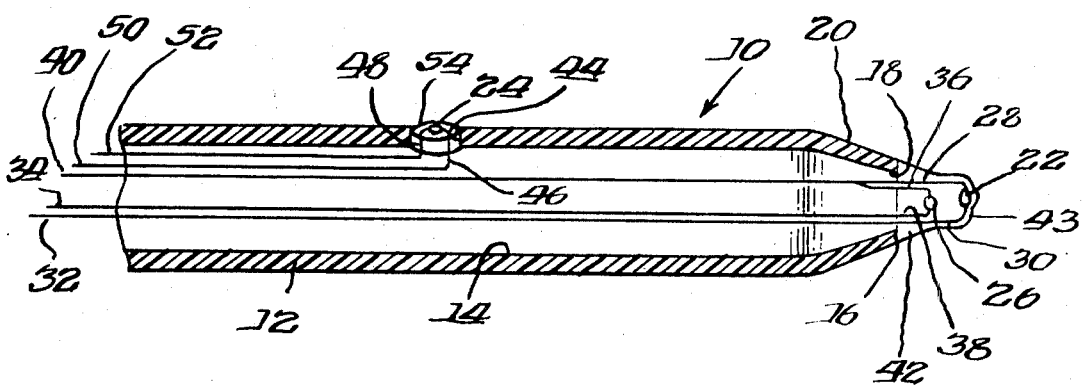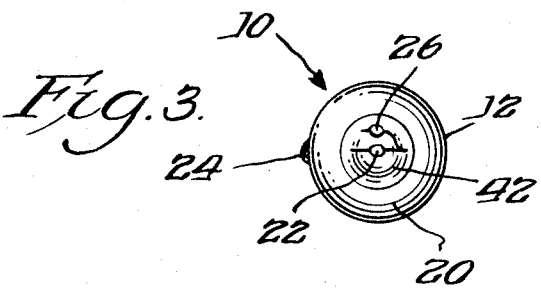

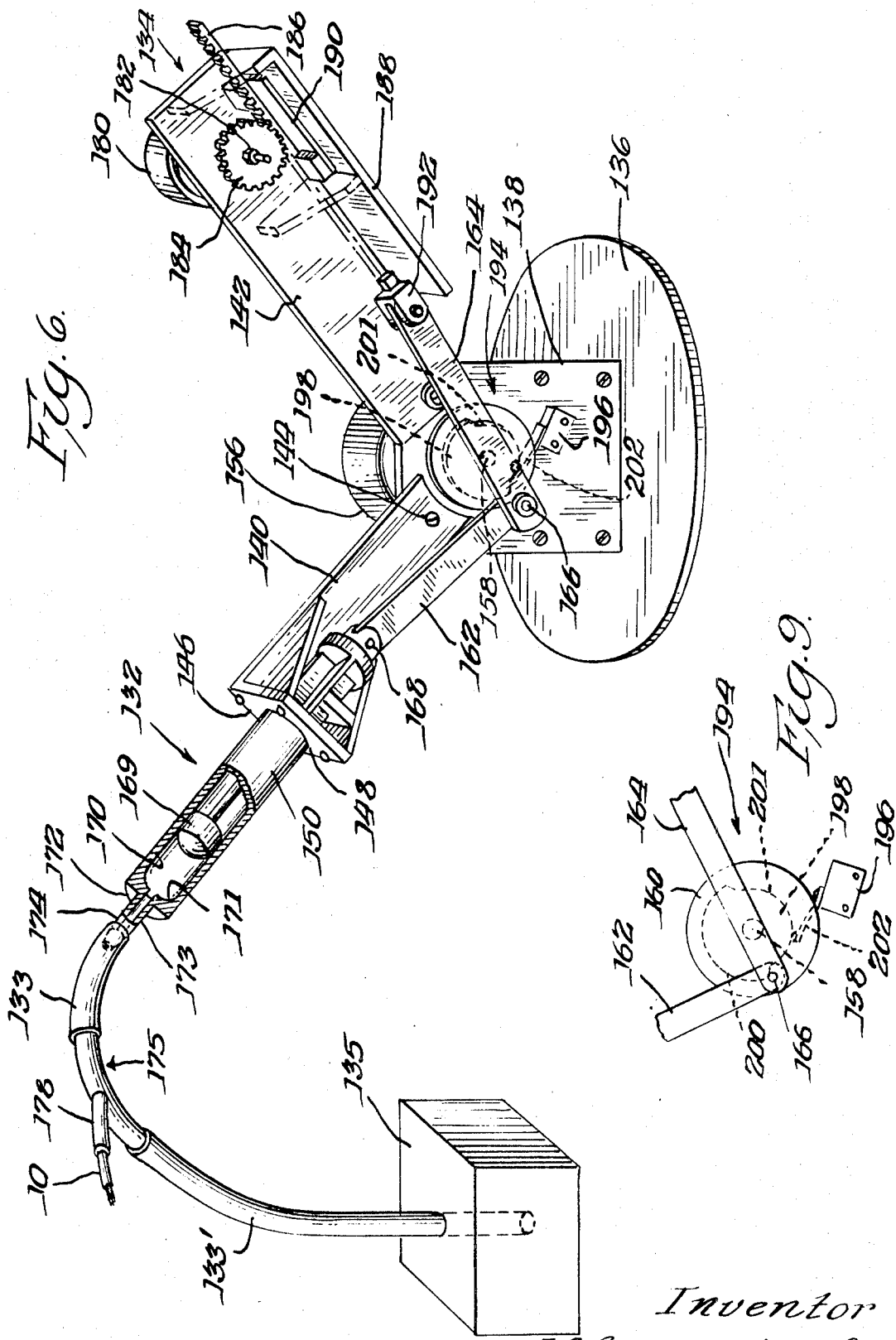

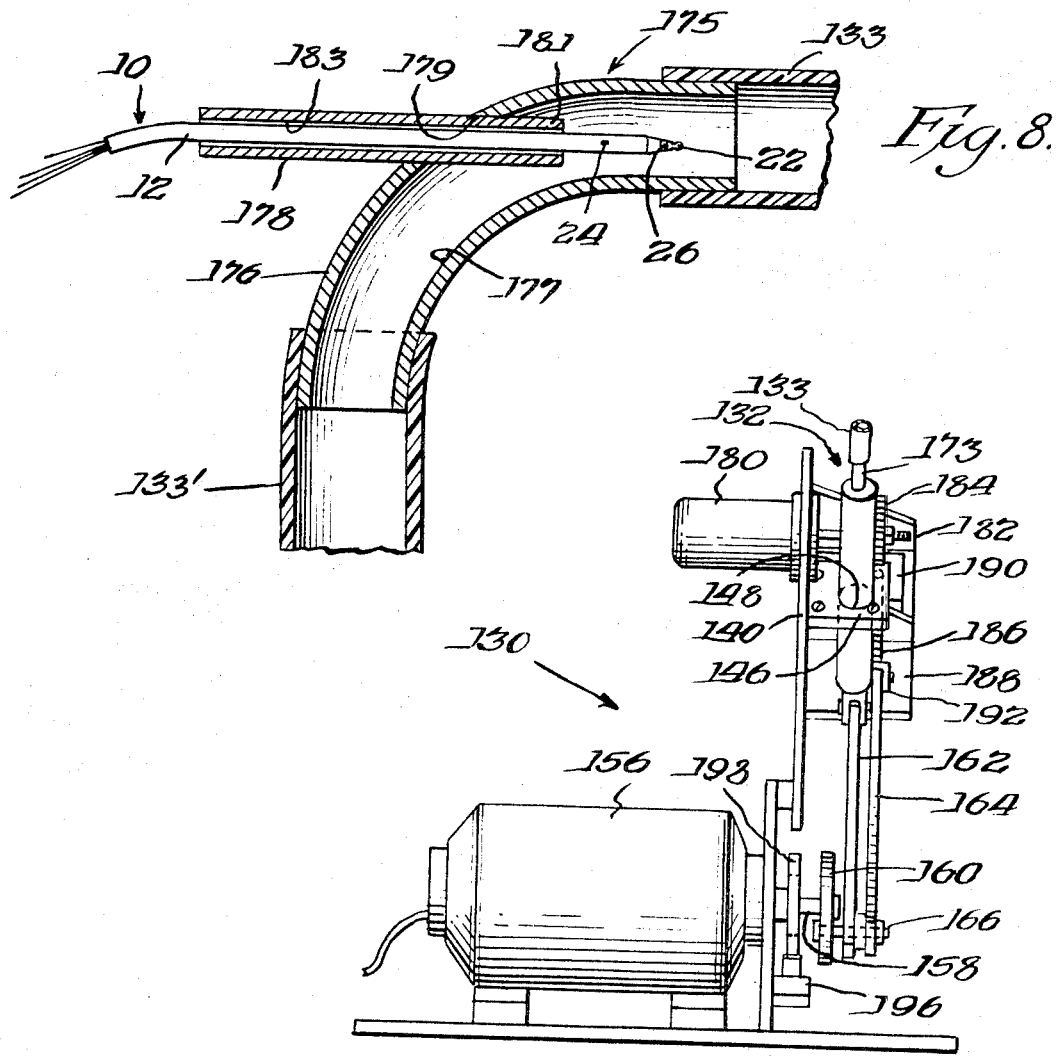

FLUID FLOW VELOCITY MEASURING APPARATUS

BACKGROUND OF THE INVENTION

The present invention relates to fluid flow measurement and more specifically to apparatus for measuring instantaneous fluid flow velocity.

In animal and human physiological studies, and in particular such studies concerned with cardiovascular functions, there has long existed a need for an apparatus to measure instantaneous blood flow velocity which can be applied routinely to persons or animals under study. Such an apparatus should be safe for human use and applicable to vessels of small diameter without requiring direct application to the vessel or flow conduit wall.

Ideally, an apparatus for measuring instantaneous blood flow velocity would employ a transducer which could be applied to a human without surgical intervention. Only two methods of this type are currently available; the transcutaneous doppler flow sensor, and an impedance method. Neither of these approaches produces quantitative results.

Attempts have been made to measure instantaneous blood flow velocity through the use of thermotransducers inserted into a blood flow vessel. Such methods are based upon measuring the rate of heat transferred into the blood utilizing the transducer as a function of flow velocity. A number of investigators have developed methods and apparatus utilizing catheter-tip mounted transducers, including thermistors which may be introduced into a superficial arterial vessel with minimal surgery. These known prior art devices and methods have not been suitable for quantitative measurements due to inadequate frequency response, nonlinear output characteristics, sensitivity to blood temperature changes, insensitivity to flow direction, and difficulties in calibration.

SUMMARY OF THE INVENTION

It is one of the primary objects of the present invention to overcome the above noted disadvantages in the prior art by providing an apparatus for measuring instantaneous fluid flow velocity, and in particular instantaneous blood flow velocity, which apparatus produces a velocity output signal proportional to the velocity of the fluid being measured.

Another object of the present invention is to provide an apparatus for measuring instantaneous fluid flow velocity which includes means to compensate for changes in temperature of the fluid being measured, and also compensates for different temperature sensitivities of the sensor means.

Another object of the present invention is to provide an apparatus for measuring instantaneous fluid flow velocity which includes means to vary the polarity of the velocity output signal dependent upon the direction of fluid flow.

Another object of the present invention is to provide an apparatus for measuring instantaneous fluid flow velocity which includes a probe having fluid flow velocity and temperature sensor thermistors thereon adapted to be inserted into a fluid flow conduit and the like, and circuit means adapted to maintain the velocity sensor thermistor at a predetermined temperature differential relative to the temperature of the fluid being measured and produce a temperature compensated output signal proportional to the fluid flow velocity.

A further object of the present invention is to provide an apparatus as above described wherein the probe further includes a flow direction sensor thermistor thereon positioned generally adjacent the velocity sensor thermistor, and wherein the circuit means is adapted to control the polarity of the velocity output signal dependent upon the direction of fluid flow.

Another object of the present invention is to provide an apparatus for measuring instantaneous fluid flow velocity as above described wherein the circuit means includes first and second bridge circuits having the sensor thermistors connected in selected arms of the bridge circuits so as to provide a temperature compensated output signal proportional to the fluid flow velocity and having a polarity dependent upon the direction of fluid flow.

Another object of the present invention is to provide a measuring apparatus as above described wherein the temperature compensating first bridge circuit includes the velocity and temperature sensor thermistors in selected arms thereof and is maintained in balanced relation through negative feedback from a differential amplifier.

A further object of the present invention is to provide an apparatus for measuring instantaneous fluid flow velocity as described wherein the circuit means includes means to compute the acceleration, mean and peak velocities of the fluid being measured.

Another object of the present invention is to provide a probe for use in measuring instantaneous fluid flow velocity, which probe has a velocity sensor thermistor supported thereon adjacent an outer end and a temperature sensor thermistor supported thereon in axial spaced relation to the velocity sensor, the velocity and temperature sensor thermistors being electrically insulated from the fluid being measured and being electrically coupled to conductors within the probe for ready connection to an electric circuit.

Another object of the present invention is to provide a probe as described having a fluid flow direction sensor thermistor supported thereon in proximate relation to the velocity sensor thermistor such that the direction sensor thermistor detects heat flow from the velocity sensor thermistor during fluid flow in one of two flow directions.

Still another object of the present invention is to provide a calibrator for use in calibrating the above described measuring apparatus which employs a variable volume fluid chamber adapted to effect fluid flow through a flow conduit having the probe sensor thermistors supported therein and subject them to known sinusoidal fluid velocity changes, and includes circuit means adapted to produce an output signal proportional to fluid flow velocity for comparison with the output signal of the measuring apparatus.

Another object of the present invention is to provide a calibrator as above described which includes switch means selectively operable to establish a second output signal during fluid flow in a selected direction.

Further objects and advantages of my invention, together with the organization and manner of operation thereof, may best be understood by reference to the following description of a preferred embodiment of the invention when taken in conjunction with the accompanying drawings, in which like reference numerals designate like parts throughout the several views.

BRIEF DESCRIPTION OF THE DRAWINGS

FIG. 1 is a side elevation view illustrating a portion of an elongated probe or catheter having velocity, temperature and direction sensor thermistors supported thereon in accordance with a preferred embodiment of the present invention.

FIG. 2 is a longitudinal sectional view of the probe illustrated in FIG. 1, taken along the line 2–2 of FIG. 1 and looking in the direction of the arrows;

FIG. 3 is an end view taken in the direction of arrows 3–3 of FIG. 1;

FIG. 6 is a perspective view of a calibrator for use in calibrating the fluid flow velocity measuring apparatus circuit illustrated in FIGS. 4 and 5, with the probe inserted within a flow tube of the calibrator and the cylinder broken away to show the piston;

FIG. 7 is an end elevational view of the calibrator shown in FIG. 6 looking from the left as viewed in FIG. 6 with the reservoir removed;

FIG. 8 is an enlarged fragmentary sectional view of the calibrator flow tube showing the probe supported within a probe support fixture.

FIG. 9 is a fragmentary front elevational view showing the link drive plate and switch actuating cam of FIG. 6; and FIG. 10 is a circuit diagram for use in an alternative method of calibrating the measuring apparatus of FIGS. 1—5.

DESCRIPTION OF A PREFERRED EMBODIMENT

The present invention will be described in detail for use in connection with the measurement of instantaneous blood flow velocity; however, it will be appreciated that the invention finds ready application in the measurement of instantaneous velocities of other fluids in flow conduits or vessels which lend themselves to the introduction of a probe or catheter device therein.

Considering briefly the theoretical considerations underlying my invention, it is known that the rate of heat transfer from a small heat source, such as a thermistor positioned in a blood flow vessel, is a function of flow velocity. The power required to maintain the temperature of the thermistor at a constant temperature differential above the blood temperature gives an indication of the relative flow velocity at the point of measurement. The heat transfer equation for a self-heated thermistor is $\delta(T-T_o)+C\, dT/dt=P$, where $\delta$ is the thermistor dissipation factor, $T$ and $T_o$ are the thermistor temperature and blood temperature, respectively, $C$ is the thermistor heat capacity, and $P$ is the heating power. For constant temperature operation of the thermistor, $dT/dt=0$, so that the above equation becomes $\delta=P/(T-T_o)=P/\Delta T$. $\delta$ is the power required to maintain the thermistor 1° above its surroundings. For constant $\Delta T$, $\delta$ can be obtained by measuring only the power, $P$, equal to the product of thermistor voltage and current.

It has been found that $\Delta$ expressed as a function of flow velocity takes on a simple relationship over the range of flow velocities which are of interest in the study of blood flow. More specifically, it has been found that the thermistor dissipation factor $\Delta$ varies linearly as the logarithm of flow velocity, therefore permitting $\Delta$ to be expressed as $\Delta=A+B \log v$. Factors A and B depend upon the thermal properties of the fluid being measured and the thermistor mounting and are established during instrument calibration, as will be more fully described hereinbelow. The last-noted equation can be rewritten as $v = \text{antilog}\,[1/B(\delta-A)]$. The subject apparatus was designed to compute the variable $1/B(\delta-A)$ and produce its antilog so that the measuring apparatus output signal varies linearly with flow velocity.

Figure 4:
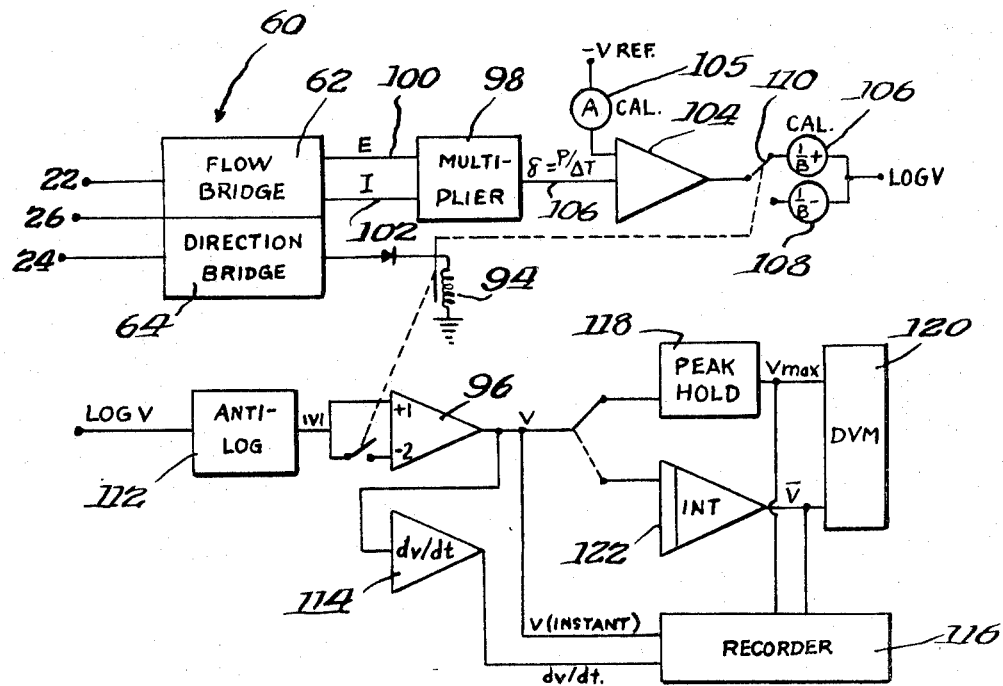
FIG. 4 is a diagrammatic illustration of the circuit means used in conjunction with the probe and sensor thermistors of FIG. 1.

Referring now to the drawings and in particular to FIGS. 1 and 4, a preferred embodiment of an apparatus for measuring instantaneous fluid flow velocity is illustrated comprising an elongated probe, shown generally at reference numeral 10 in FIG. 1, and associated circuit means, shown diagrammatically in FIG. 4. As will be more fully explained hereinbelow, the circuit means to produce output signals indicating the mean velocity, peak velocity and acceleration of the fluid flow being measured.

Referring to FIGS. 1—3, the probe 10 includes an elongated body 12 which preferably has a cylindrical outer peripheral surface having a relatively small diameter suitable to allow the probe to be inserted into a flow conduit, such as a blood vessel in a human or an animal being tested. Preferably, the probe 10 is inserted into the flow stream such that the axis of the probe coincides with the central axis of the flow conduit. Commercially available cardiac catheters made of nylon, polyethylene, or polyvinyl flexible tubing have been found suitable for this purpose, the flexibility property allowing the probe to follow the contour of a flow vessel as necessary when inserted therein. The body 12 is hollow, having a passage 14 extending longitudinally therethrough, and has an outer or forward end portion 16 which the passage 14 intersects to define an opening 18 in the outer end of the probe. The outer peripheral surface of the body 12 is preferably tapered at 20 to assist in introducing the probe it into a fluid flow vessel. The longitudinal length of the probe 10 may be varied as desired, it being dependent upon the length of probe necessary to reach the flow vessel selected and insert a portion of the probe within the vessel as will become more apparent hereinbelow.

The probe 10 serves to support fluid flow sensor means which are disposed within the fluid flow vessel during measurement of the fluid flowing therein. The fluid flow sensor means comprise a fluid flow velocity thermistor 22, a fluid flow temperature thermistor 24 and a fluid flow direction sensor thermistor 26, which are selectively positioned on the probe. The velocity sensor thermistor is preferably positioned axially outwardly from the forward or front end 16 of the body 12 generally adjacent the front end. The velocity sensor thermistor 22 has conductor leads 28 and 30 connected to suitable electrical conductors 40 and 32 which extend longitudinally within the passage 14 of the probe. The fluid flow direction sensor thermistor 26 is also supported outwardly from the front end portion 16 of probe 10 and has conductor leads 36 and 38 suitably connected to electrical conductors 40 and 34, respectively, extending longitudinally within the probe passage 14. For convenience in reducing the member of conductor wires to a minimum, the lead 36 of the direction sensor thermistor 26 and the lead 28 of the velocity sensor thermistor 22 may be connected to the common conductor 40.

The velocity sensor thermistor 22 and the direction sensor thermistor 26 are maintained in fixed relation outwardly from the outer end portion 16 of probe 10 by thermal-setting epoxy resin 42 which, when hardened, forms a generally conical wedge-shaped tip on the outer end of the probe. The velocity sensor thermistor 22 and direction sensor 26 are oriented relative to the end portion 16 of the probe such that the velocity sensor thermistor is preferably positioned approximately 1 and 2 mm. outwardly from the outer end 16, while the direction sensor thermistor 26 is preferably positioned less than 0.5 mm. proximal to the velocity sensor thermistor. Noting FIG. 2, the portions of the leads 28 and 30 adjacent the velocity sensor thermistor 22 are disposed generally radially outwardly from diametrically opposite positions on the thermistor so as to form an outer end edge 43 on the wedge-shaped tip of the probe. Positioning the thermistor 22 and adjacent lead portions 28 and 30 in this manner serves to improve the heat transfer between the thermistor and adjacent lead portions and the fluid and thereby improves the response of the measuring apparatus to changes in fluid flow velocity. The epoxy resin forming the tip 42 forms a thin coating on the thermistor 22 and its lead portions 28 and 30 adjacent the end edge 43 of the tip to an extent necessary to electrically insulate the thermistor and lead portions from the fluid being measured, while allowing adequate heat transfer from the thermistor and lead portions to the fluid.

The direction sensor thermistor 26 is positioned between the end 16 of the probe 10 and the velocity sensor thermistor 22 but is offset from the axis of the tip 42 so that it lies adjacent the peripheral surface of the tip cone while maintaining the above-noted distal relation to the velocity sensor thermistor. It is desirable that the portions of leads 36 and 38 adjacent thermistor 26 be disposed radially outwardly from the thermistor in similar fashion to the leads 28 and 30 of thermistor 22 to improve the sensitivity of the thermistor 26 to heat given off by thermistor 22 and thus improve sensitivity of the measuring apparatus to changes in direction of fluid flow. The epoxy forming the tip 42 of the probe also thinly coats the thermistor 26 and adjacent lead portions to electrically insulate them from the fluid being measured. In addition to maintaining the velocity sensor thermistor 22 and the direction sensor thermistor 26 in fixed spaced relation and insulating the thermistors and their respective leads from electrical contact with the fluid flow being measured, the epoxy resin 42 serves to seal the opening 18 in the outer end 16 of the probe 10 to prevent the introduction of fluid therethrough and adds mechanical strength to the fragile thermistors.

A second opening 44 is provided in the probe 10 axially spaced from the outer end portion 16 thereof. The opening 44 is provided in the peripheral surface of the body 12 and intersects the inner passage 14. The temperature sensor thermistor 24 is received through the opening 44 and has leads 46 and 48 thereon connected to suitable electrical conductors 50 and 52, respectively, which extend longitudinally within the passage 14. The temperature sensor thermistor 24 is maintained in fixed position relative to the outer periphery of the body 12 through a thermal setting epoxy resin 54 which is similar to the epoxy resin used for the previously described cone tip 42. The epoxy resin 54 forms a thin coating about the temperature sensor thermistor 24 and its adjacent leads so as to electrically insulate them from the fluid being measured, and maintains the temperature sensor thermistor in a position such that it lies substantially in the peripheral surface of the body 12, projecting slightly outwardly therefrom. The resin 54 also serves to seal the opening 44 to prevent the entry of fluid within the probe passage 14.

It has been found that commercially available thermistor beads having a diameter of 0.005 inch and a thermal time constant of 10 milliseconds in blood provide suitable fluid flow sensors for mounting on the probe 10 as above described. The electrical conductors 32, 34, 40, 50 and 52 comprise conductor means within the passage 14 of the probe 10 and may comprise a suitable length of Litz wire consisting of five strands of No. 44 enameled copper wire wrapped in a nylon sheath which may be passed through the passage 14 of the probe. The leads of the sensor thermistors are suitably connected to the electrical conductor wires as by soldering.

Referring now to FIG. 4, the circuit means used in conjunction with the above-described probe and sensor thermistors is illustrated diagrammatically. The circuit means includes a dual bridge circuit shown generally at reference numeral 60, comprised of a first self-balancing DC Wheatstone bridge circuit 62 which serves to maintain the velocity sensor thermistor 22 at a predetermined temperature differential relative to the temperature of the fluid being measured, and a second DC Wheatstone bridge 64 which serves to assign the appropriate polarity to the velocity signal and provide equal sensitivity for the measuring apparatus for forward and reverse flow as will be more fully described hereinbelow. The outputs of the dual bridge circuit 60 contain all the necessary information concerning flow velocity, with such outputs being manipulated by the remaining portions of the circuit means to give instantaneous flow velocity, acceleration, peak and average or mean velocity.

Figure 5:
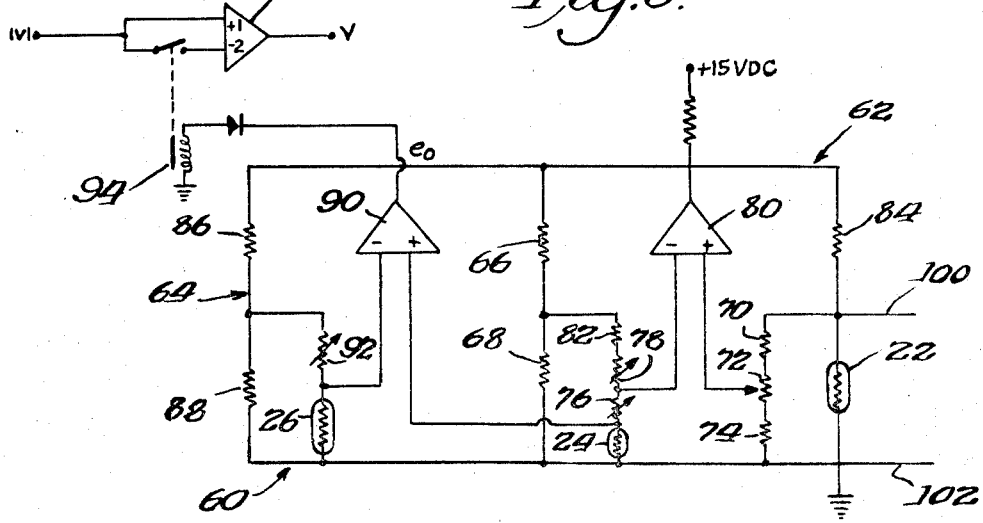
FIG. 5 is a circuit diagram of the bridge circuits shown diagrammatically in FIG. 4, showing the velocity, temperature and flow direction sensor thermistors connected in selected arms of the bridge circuits, and the relay control for establishing the polarity of the output velocity signal.

FIG. 5 shows the specific circuit elements comprising the dual bridge circuit 60 of the measuring apparatus circuit means. The first self-balancing DC Wheatstone bridge circuit 62, designated the flow bridge in FIG. 4, serves as the constant temperature difference bridge. As noted above, the bridge circuit 62 maintains the fluid flow velocity sensor thermistor 22 at a constant temperature differential relative to the temperature of the fluid being measured. The velocity sensor thermistor 22 and the temperature sensor thermistor 24 form two arms of the self-balancing bridge 62. A voltage divider comprised of resistors 66 and 68 is connected in bridge 62 to reduce the voltage across temperature thermistor 24 and prevent the temperature thermistor from heating enough to become flow sensitive. A voltage divider comprising resistors 70, 72 and 74 is connected across the velocity sensor thermistor 22 to reduce the voltage input signal to an amplifier 80 from the arm of the bridge circuit including the velocity thermistor 22 by the same factor as the voltage reduction established by resistors 66 and 68, thereby preserving bridge balance. A variable resistor 76 is connected in series with the temperature sensor thermistor 24 and adjusted to compensate for the difference in temperature sensitivity between the two thermistors 22 and 24. A variable resistor 78 is connected in the bridge circuit to offset the effect of the variable resistor 76 on bridge balance and is adjusted simultaneously with adjustment of resistor 78 during calibration as described below. The amplifier 80 comprises a high gain DC differential amplifier connected as a differential integrator across the arms of the bridge circuit having the thermistors 22 and 24 therein and establishes a negative feedback along with the necessary rolloff in gain for dynamic stability. A resistor 82 is connected to reduce the sensitivity of the setting of variable resistor 78. A resistor 84 serves as the fourth arm of the bridge.

The second DC Wheatstone bridge circuit 64, termed the direction bridge in FIG. 4, serves to sense the direction of fluid flow and establish an output signal which is used to reverse the polarity of the signal produced by the flow bridge circuit 62 such that the bridge circuit signal will be positive for flow in one direction, and negative for flow in the opposite direction. Polarity reversal requires a minimal lag time between detection of flow direction and signal reversal. It has been found that the lag time due to flow velocity is minimized by mounting the direction sensor thermistor as close as possible to the velocity sensor thermistor such that the direction sensor thermistor senses the heat given off by the velocity sensor thermistor during fluid flow over the thermistors. The temperature sensor thermistor senses the direction of heat flow from the velocity sensor thermistor such that fluid flowing toward the tip of the probe 10 and velocity sensor thermistor 22 will heat the direction sensor thermistor 26, while flow in the opposite direction will not. The direction sensor thermistor 26 and temperature sensor thermistor 24 are connected in opposite arms of the second DC Wheatstone bridge or direction bridge 64.

Resistors 86 and 88 are connected in the bridge circuit 64 to reduce the voltage across the direction sensor thermistor 26 so that it will not be heated enough to become flow sensitive. An amplifier 90 is connected in the bridge circuit 64 and operated open loop so that the output voltage $e_o$ therefrom will be either plus 10 or minus 10 volts. A variable resistor 92 is connected in the bridge circuit 64 as shown and is adjustable to determine the temperature of sensor thermistor 26 at which the output voltage $e_o$ of the amplifier 90 changes sign, the temperature of thermistor 26 being dependent upon the heat transfer from velocity thermistor 22 and the direction of fluid flow. The variable resistor 92 is adjusted to effect a change in the polarity of $e_o$ when the flow changes direction and is termed the circuit means direction control. An inverting relay 94 of a summing amplifier 96 is connected to the output $e_o$ of the amplifier 90 to control the polarity of the velocity signal as below described. If desirable, a manually operable toggle switch (not shown) may be coupled to the input of the summing amplifier 96 so that the polarity of the velocity signal can be made positive for forward flow irrespective of upstream or downstream insertion of the probe 10 into the fluid flow vessel under study.

Due to the fact that heating of the direction sensor thermistor 26 is reduced at high flow velocities, the polarity of the output signal $e_o$ of amplifier 90 may change at high flow velocities without an actual flow reversal. In order to avoid this erroneous operation of the relay 94, a conventional deadspace circuit (not shown) is preferably provided in the circuit means to render the relay 94 inactive for velocities greater than approximately plus or minus 10 cm./sec.

Referring now to FIG. 4, taken in conjunction with FIG. 5, the voltage (E) appearing across the velocity sensor thermistor 22 and a voltage proportional to the current (I) through thermistor 22 when the thermistor is maintained at the above described temperature differential relative to the temperature of the fluid being measured, are fed to a conventional multiplier 98 through conductors 100 and 102. The multiplier 98 computes the power required to heat the velocity sensor thermistor 22 as the product of velocity sensor voltage E and a voltage proportional to the current I. The output signal of the multiplier 98 is coupled to a summing amplifier 104 through a conductor 106. A voltage proportional to $-A$ is summed in amplifier 104, the factor "A" being a factor in the above-noted equation for determining velocity upon which the present invention is based, and which factor depends upon the thermal properties of the fluid being measured and the thermistor mounting. The factor "A" is established during instrument calibration by adjustment of a calibrating potentiometer 105, as will be described more fully hereinbelow.

The output of the amplifier 104 is connected to either of a pair of potentiometers 106 and 108 through a switch means 110 which is suitably controlled by the above-described direction bridge controlled relay 94. As noted above, the factor B depends on the thermal properties of the fluid being measured and the particular velocity sensor thermistor mounting on the probe 10. The velocity sensor thermistor 22 is more sensitive to flow in a first direction toward the tip 2 of the probe than flow in the opposite direction. This is due to partial shielding of the velocity sensor thermistor by the probe during flow in said opposite direction, thus reducing the rate of heat transfer from the velocity sensor thermistor to the fluid. My above-described fluid flow velocity equation $v = \text{antilog}\,[(1/B+)\,(\delta-A)]$ is applicable for flow in the noted first direction but becomes $v = \text{antilog}\,[(1/B-)\,(\delta-A-)]$ for flow in the noted opposite direction. The potentiometers 106 and 108 are adjusted during calibration to electrically compensate the measuring apparatus circuit means for such changes in flow sensitivity due to changes in fluid flow direction, and thus establish the factors $1/B+$ and $1/B-$, respectively. The factor "$A-$" is approximately equal to the factor "$A$" and therefore need not be compensated for.

The output signal of the amplifier 104, after passing through either potentiometer 106 or 108, is proportional to the logarithm of fluid flow velocity measured and is fed into a conventional antilog circuit 112 which produces a signal proportional to flow velocity. The flow velocity signal established by the antilog circuit 112 is fed above-described the above-described summing amplifier 96 which establishes the polarity of the velocity signal through operation of the relay 94 as above described. The velocity output signal from the amplifier 96 is then fed into a conventional differentiator 114 to establish a fluid flow acceleration output signal which, in turn, is fed to a recorder 116. The velocity output signal of the amplifier 96 is also fed to a conventional peak holding circuit 118 which provides an output voltage proportional to both the peak forward and peak reverse fluid flow velocity. The output voltage signal of the peak holding circuit 118 may be coupled to a digital voltmeter 120 and to the recorder 116. The voltage output signal of the amplifier 96 may also be fed to a suitable amplifier 122 which serves as a filter to provide a mean velocity signal. The mean velocity signal from the amplifier 122 may be applied to the digital voltmeter 120 and the recorder 116.

Having thus described a preferred embodiment of my instantaneous fluid flow velocity measuring apparatus as comprising the probe 10 having the velocity sensor thermistor 22, the temperature sensor thermistor 24 and the direction sensor thermistor 26 thereon, and the associated circuit means illustrated in FIGS. 4 and 5, its operation will be readily apparent. The fluid flow vessel, such as a blood vessel in a human or animal, in which it is desired to measure mean velocity, peak velocity, acceleration and flow direction, is suitably prepared to receive the probe 10 therein such that the three thermistors are within the fluid flow vessel. The velocity of the fluid flow is detected by the fluid flow velocity sensor thermistor 22 which is maintained at a constant temperature relative to the temperature of the fluid being measured. The voltages required to maintain the velocity sensor thermistor at the predetermined temperature differential relative to the temperature of the fluid being measured are fed to the associated above-described circuit means to establish an output velocity signal proportional to the velocity of the fluid being measured. The velocity output signal is compensated for changes in temperature of the fluid being measured over a 10° C. temperature change range by the temperature sensor thermistor 24 and the associated circuitry above described. The direction of fluid flow is sensed by the direction sensor thermistor 26 which, with its associated circuitry, varies the polarity of the velocity output signal dependent upon the direction of fluid flow.

As noted above, the factors "A," 1/B+, and 1/B− are established during calibration of the subject measuring apparatus. FIGS. 6, 7 and 8 illustrate a calibrator for use in establishing the factors "A," 1/B+ and 1/B−, and for adjusting the circuit means of the measuring apparatus to indicate the change in direction of fluid flow. The calibrator, indicated generally at reference numeral 130, includes a cylinder piston arrangement, indicated generally at 132, adapted to effect fluid flow through a flow conduit 133 from a fluid reservoir 135, and means, indicated generally at reference numeral 134, for generating an electrical output signal directly proportional to the velocity of the reciprocating piston of the cylinder piston arrangement 132 and thus proportional to the velocity of fluid flow within the flow conduit 133, as will become more apparent hereinbelow.

The calibrator 130 includes a base plate 136 upon which is suitably affixed an upstanding support plate 138. The support plate 138 has a pair of generally upstanding outwardly directed support arms 140 and 142 suitably secured thereon as through bolt means 144. The support arm 140 has a support bracket member 146 supported thereon in normal relation to the plane of the arm 140. The support bracket 146 is preferably provided with an aperture 148 therethrough which receives and suitably supports a cylinder 150 of the cylinder piston arrangement 132. The cylinder 150 is fixed axially within the aperture 148 through conventional means, with the central axis of the cylinder intersecting the axis of a drive motor shaft 158 and being normal thereto.

The upstanding support plate 138 has a constant speed electric motor 156 supported thereon such that its drive shaft 158 projects outwardly through an aperture in the support plate in normal relation to the plane thereof. The constant speed electric motor 156 preferably comprises a single speed motor having a rotary speed of approximately 60 r.p.m. The outer end of the drive shaft 158 has a generally circular plate 160 secured thereon such that the plane of the plate is normal to the axis of the drive shaft. A pair of link members 162 and 164 are pivotally supported on the circular plate 160, offset from the axis of rotation thereof, such as through a nut and bolt 166. The nut and bolt 166 and the corresponding pivotally supported end portions of the links 162 and 164 are thus eccentrically positioned relative to the axis of rotation of the circular plate 160.

The link 162 has its end opposite the connection to plate 160 pivotally connected to the outer end of a piston rod 168 having a cylindrical piston 169 slidably received within the cylinder 150 in a conventional manner. The cylinder 150 is supported by the support bracket 146 such that its central axis lies in a plane containing the longitudinal axis of the link 162, which plane is parallel to the plane of the circular support plate 160.

The cylinder 150 of the cylinder piston arrangement 132 has a cylindrical axial passage or chamber 170 which receives the piston 169 in sliding relation therein. Preferably, the cylinder 150 has a generally semispherical surface 171 therein defining the outer end of the axial chamber 171, and the outer end of piston 169 is provided with a similar convex semispherical shape to reduce flow turbulence during reciprocation of piston 169 as will become more apparent hereinbelow. The cylinder 150 includes an end portion 172 having an axially extending tubular projection 173 thereon which defines a flow passage 174 communicating with the chamber 170 within the cylinder 150. The tubular extension 173 has an outer diameter sufficient to receive one end of the flow tube or conduit 133 thereover and suitably retain the flow tube thereon. The fluid flow conduit 133 is preferably of a conventional flexible transparent material, such as polyethylene tubing material to allow visual observation of fluid flow therein. The flow conduit 133 is separated or divided along the length thereof so as to receive a probe mounting fixture 175 between the portion of the tubing connected to the tubular projection 173 and a lower conduit portion 133' which is suitably inserted within or otherwise connected in flow communicating relation with the reservoir 135. The reservoir 135 may comprise any suitable liquid storage container of a capacity sufficient to retain a quantity of fluid to maintain the conduit 133 and pressure chamber 170 full of fluid during operation of the calibrator.

Noting FIG. 8, the probe support fixture 175 includes a curved cylindrical tubular body portion 176 of a length such that its end portions may be suitably received and retained within the adjacent ends of the fluid flow conduit sections 133 and 133'. The tubular body 176 may be of a relatively rigid plastic material or a metallic tube having a central passage 177 therethrough of substantially the same cross-sectional area as the flow conduits 133 and 133'. A relatively straight tubular insert 178 is suitably received and secured within an aperture 179 in the peripheral surface of the probe support fixture body 176 and has an axially extending end portion 181 disposed in generally coaxial relation with the central axis of the axial passage 177. The tubular insert 178 has an axially extending passage 183 therein of a diameter sufficient to slidably snuggle receive the body portion 12 of a fluid flow measuring probe 10 in a manner to prevent fluid flow between the probe and peripheral surface of the passage. The probe 10 is inserted within the tubular insert 178 a distance such that the forward end of the probe projects outwardly of the end 181 of the insert to expose the velocity, temperature, and direction thermistors 22, 24 and 26, respectively, to fluid flow within the axial passage 177 of the probe support fixture 175.

The fluid reservoir 135 is filled with a sufficient quantity of fluid having thermal characteristics similar to the thermal characteristics of a fluid which is to have its flow velocity subsequently measured by the measuring probe 10. With the probe 10 of the measuring apparatus inserted within the probe support fixture 175, as above described, with the sensor thermistors exposed within the flow passage 177, reciprocating movement of piston 169 within the cylinder piston arrangement 132 will effect fluid flow within the conduits 133', 177 and 133 from the reservoir 135. By making the length of link 162 substantially greater than the distance between the pivotal connection 166 of the link 162 to plate 160 and the axis of motor shaft 158 (i.e. the eccentricity of 166 to shaft 158), and using a constant speed electric motor 156, the piston 169 will be reciprocated substantially sinusoidally and thus establish a sinusoidal flow velocity within the flow conduit 133 and over the sensor thermistors disposed within the probe supporting fixture 175.

The support arm 142 has a conventional linear potentiometer 180 suitably secured thereto such that an actuating rotor shaft 182 of the potentiometer projects through a suitable opening in the support arm with the axis of the shaft being normal to the plane of the support arm. A circular gear member 184 is mounted upon the potentiometer shaft 182 such that the plane of the gear is normal to the axis of the potentiometer shaft. The gear 184 is spaced outwardly from the support arm 142 to allow free rotation thereof and is adapted to have its peripheral teeth engaged by a rack member having teeth thereon suitable to compatibly engage the teeth of gear 184 in a conventional manner. The rack 186 is supported for axial reciprocating sliding movement on a bearing support means 190 which in turn is supported by a plate 188 fixed to the support arm 142. The rack 186 has a generally U-shaped coupling member 192 secured to one end thereof, with the coupling member being pivotally connected to the end of link member 164 opposite the pivotal connection 166 of the link to the circular plate 160. The rack member 186 is suitably supported by the bearing support means 190 with the longitudinal axis of the rack intersecting the axis of motor shaft 158 to allow axial reciprocating movement thereof through rotation of the circular support plate 160 and a corresponding reciprocating movement of the link member 164. It will be understood that reciprocating movement of the rack 186 will effect rotary movement of the gear member 184 and thereby effect changes in the output signal of the potentiometer 180 dependent upon the longitudinal position of the rack. The geometry of the calibrator 130 is such that the longitudinal axes of cylinder 150 and rack 186 form an included angle of 90° therebetween when considered in the plane of FIG. 6. The movement of links 162 and 164 relative to each other during a rotary cycle of the circular support plate 160 will thus be 90° out of phase. The output signal of the potentiometer 180 will therefore be in direct relation to the velocity of piston 169 and thereby directly proportional to the velocity of fluid flow within the fluid flow passage 177 of the probe support fixture 175 having the probe 10 therein.

With the calibrator 130 constructed as above described and the probe 10 of the above-described fluid flow velocity measuring apparatus properly inserted in the probe support fixture 175, calibration is effected as follows. By knowing the internal diameter of the fluid flow passage 177 of probe support fixture 175, the displacement volume of the piston 169 within cylinder 150, and the rotary speed of plate 160, a known fluid flow velocity is established past the sensor thermistors of probe 10. Knowing the velocity and direction of fluid flow and having a velocity signal from potentiometer 180 directly proportional to the known velocity the output signal of the potentiometer 180 may be readily displayed on a conventional dual beam oscilloscope for comparison with the velocity output signal from the amplifier 96 of the measuring apparatus circuit means. The circuit means of the measuring apparatus may then be adjusted to bring the measured velocity signal into phase and magnitude relation with the velocity output signal from the calibrator potentiometer 180. Prior to adjusting the velocity signals of the measuring apparatus and the calibrator to bring them into proper relation, the bridge circuit 62 of the measuring apparatus is adjusted through variable resistors 76 and 78 to compensate for the difference in temperature sensitivity between the temperature thermistor 24 and the velocity sensor thermistor 22. The latter adjustment is necessary due to the inherent difference in temperature sensitivity of a thermistor at different temperatures. As the fluid temperature sensor thermistor 24 on the above-described probe 10 is adapted to sense the temperature of the fluid being measured, and the flow velocity sensor thermistor 22 is maintained at a higher temperature relative to the temperature of the fluid being measured, the magnitude of the temperature sensitivity of thermistor 24 will be higher than that of thermistor 22. Consequently, a change in temperature of the fluid being measured will indicate an erroneous change in the velocity output signal of the measuring apparatus circuit means. By effecting a constant flow velocity within the passage 177 of the probe support fixture 175, and suitably varying the temperature of the fluid within reservoir 135 in a conventional manner through a known temperature range, such as the above-described temperature change range of 10° C. which might be expected in the fluid to be subsequently measured, the variable resistors 76 and 78 may be adjusted to minimize the indicated change in fluid velocity due to the change in temperature of the fluid being measured.

Upon adjusting the resistors 76 and 78 to compensate for the difference in temperature sensitivity of the thermistors 22 and 24, the velocity output signals of the calibrator potentiometer 180 and the measuring apparatus amplifier 96 are displayed on the dual beam oscilloscope and the measuring apparatus circuit means adjusted in the following manner. The above-described variable resistor 92 is adjusted until the velocity signal of the measuring apparatus changes polarity simultaneously with the change in polarity of the velocity output signal from calibrator potentiometer 180. This adjusts the phase relation between the two velocity signals. The potentiometers 105 and 106 are alternately adjusted until the positive portions of the velocity output signal displayed on the oscilloscope coincide or are superimposed one on the other, thus establishing the above-described factors "A" and 1/B+. The potentiometer 108 is then adjusted to obtain optimum coincidence between the negative portions of the velocity output signals from the measuring apparatus circuit means and the calibrator potentiometer 180, thereby establishing the factor 1/B—. After so adjusting or calibrating the circuit means of my fluid flow velocity measuring apparatus, the probe 10 may be suitably inserted into a vessel or flow conduit in which it is desired to measure instantaneous, mean and peak flow velocity, and fluid flow acceleration.

An alternative method of calibrating my fluid flow velocity measuring apparatus eliminates the above-described dual beam oscilloscope and employs the digital voltmeter 120. The alternative method of calibration feeds the velocity output signals of the measuring apparatus circuit means and the calibrating potentiometer 180 to the digital voltmeter 120 in a conventional manner and adjusts the measuring apparatus through potentiometers 105, 106 and 108 to minimize the differences between the magnitudes of the positive and negative portions of the measuring apparatus velocity output signal when compared to the reference output signal of the calibrator potentiometer, thereby obtaining an output signal directly proportional to fluid flow. The manner of adjusting the velocity output signal of the measuring apparatus such that its polarity changes simultaneously with a change in the direction of fluid flow differs somewhat from the manner above described for use with a dual beam oscilloscope.

When employing the alternative nulling method of calibration, additional means are provided on the calibrator 130 for establishing first and second output signals, the first signal being produced during fluid flow in one direction in the flow conduit 133 and the second signal being produced during fluid flow in the opposite direction. Referring to FIG. 6, such additional means is indicated generally by reference numeral 194 and includes a suitable two-position switch 196, such as a conventional microswitch, secured to the upstanding support plate 138 in a position to be actuated to first and second operating positions by a cam member 198. The cam 198 is fixedly secured on the drive shaft 158 of the constant speed motor 156 so as to be rotatable therewith and includes arcuate switch actuating lobe portions 200 and 201 having arcuate extents of approximately 180°. The microswitch 196 is positioned such that an actuating lever 202 thereon is actuated to the first operative position when engaged by the lobe portion 200 of cam 198 and actuated to the second operating position when engaged by the lobe portion 201. It will be understood that switch 198 will thus be actuated to the first on position during approximately one-half revolution of the cam 198, and actuated to the second on position during the remaining one-half revolution of the cam. The cam 198 is positioned on the motor drive shaft 158 such that the switch 196 will be actuated to the first on position during fluid flow within fluid conduit 133 in one direction, as when the piston 169 is moving toward the end 172 of cylinder 150, and actuated to the second on position during flow in the opposite direction. The switch 196 is open or in a nonoperating position for a very short period of time as the lever 202 passes between lobe portions 200 and 201 of the cam 198 twice during each revolution thereof.

FIG. 10 illustrated diagrammatically a circuit for use with the switch 194 of the calibrator 130 and the circuit means of the measuring apparatus to allow the circuit means to be adjusted such that the velocity output signal therefrom will change polarity simultaneously with a change in the direction of fluid flow. The switch 196 is connected in circuit to a suitable voltage source 204, such as a DC battery. Switch 196 includes a pair of contacts 206 and 208 which form first and second operating positions for the switch and are connected, respectively, to contacts 210 and 212 of a suitable switch means 214. The switch means 214 includes a movable switch arm 216 actuated through a relay 218 which is suitably connected to the above-described direction bridge circuit 64 so as to be energized simultaneously with the energizing of relay 94. The switch arm 216 is connected to an indicating means such as an incandescent lamp 220, the lamp being also connected to the voltage source 204 such that closing of switch means 214 through contact 210 when the actuating lever 202 of switch 196 has closed contact 206 will energize the lamp. It can be seen that lamp 220 will also be energized when the contact 212 of switch 214 is closed through arm 216 and the contact 208 of switch 196 has been closed through rotation of cam 198 to a position wherein actuating lever 202 engages cam surface portion 201.

As noted above, the cam 198 is disposed on the motor drive shaft 158 such that switch 196 will be actuated to a first closed operating position (closing contact 206) during fluid flow within conduits 133 and 177 in a first selected direction, and will be actuated to a second closed operating position (closing contact 208) during flow in an opposite direction. The relay 218, being similar in operation to relay 94, is controlled through adjustment of the direction control variable resistor 92 such that relay 218 will actuate switch arm 216 to close either contact 210 or 212 dependent on the temperature of direction sensor thermistor 26. The temperature of thermistor 26 is dependent upon the direction of fluid flow past the velocity sensor thermistor 22. With the probe 10 inserted within the flow passage 177 of the probe support fixture 175 so as to be subjected to known changes in the direction of fluid flow, the resistor 92 may be adjusted such that switch arm 216 is actuated to alternately close contacts 210 and 212 simultaneously with the closing of the corresponding contacts 206 and 208, respectively, by the cam 198 to thereby maintain the indicating light 220 energized for a maximum length of time. Adjusting resistor 92 to change the position of switch arm 216 simultaneously with a similar change in the position of switch lever 202 of switch 196 effects a reversal of the polarity of the velocity output signal of the measuring apparatus when the direction of fluid flow is reversed.

While a preferred embodiment of my invention has been shown and described, it will be obvious to those skilled in the art that changes and modifications may be made therein without departing from the invention in its broader aspects, and therefore, the appended claims are intended to cover all such changes and modifications as fall within the true spirit and scope of my invention.

I claim:

1. Apparatus for measuring instantaneous fluid flow velocity comprising, in combination, a probe having an elongated tubular body and an end portion adapted to be inserted into a fluid flow conduit, said end portion having a first opening, said tubular body defining a longitudinally extending passage therethrough intersecting said first opening, said probe body further having a second opening in the peripheral surface thereof axially spaced from said first opening and intersecting said passage, sensor means including fluid flow velocity, temperature and direction sensor thermistors supported by said probe for insertion into the fluid flow conduit to sense the velocity, temperature and direction of the fluid flow being measured, and circuit means associated with said sensor means and adapted to produce a continuously temperature compensated velocity output signal proportional to the flow velocity of the fluid being measured, said circuit means including amplifier means adapted to directly and continuously maintain said velocity sensor at a predetermined temperature differential relative to the temperature of the fluid being measured, said circuit means being further adapted to compute the electrical power required to maintain said velocity sensor at said predetermined temperature differential, said circuit means including means associated with said direction sensor thermistor to alter the polarity of said velocity output signal dependent on the direction of fluid flow being measured, said velocity sensor thermistor and said direction sensor thermistor being supported generally outwardly from said first opening and being connected to said circuit means through said first opening, and said temperature sensor means being supported generally adjacent said second opening and being connected to said circuit means through said second opening.

2. Apparatus according to claim 1 including means electrically insulating said thermistors from the fluid flow being measured, said insulating means serving to seal said longitudinally extending passage at said first and second openings so as to preclude the entry of fluid therein.

3. A probe for use in measuring instantaneous fluid flow velocity comprising a generally elongated tubular body member having at least one open end portion and defining a longitudinally extending passage intersecting said open end portion, electrical conductor means extending within said passage, fluid flow velocity sensor means supported by said body member outwardly from said open end portion and electrically connected to said conductor means, fluid flow temperature sensor means supported by said body in longitudinally spaced relation from said velocity sensor means and electrically connected to said conductor means, and means electrically insulating said velocity and temperature sensor means from the fluid flow being measured, said insulating means serving to seal said longitudinally extending passage at said open end portion so as to preclude the entry of fluid therein.

4. A probe as defined in claim 3 wherein said velocity and temperature sensor means comprise thermistors.

5. A probe as defined in claim 3 wherein each of said velocity and temperature sensor means comprises comprises a single thermistor having leads connected to said electrical conductor means.

6. A probe as defined in claim 5 wherein said elongated tubular body includes a second opening spaced longitudinally from said open end portion and communicating with said longitudinally extending passage, and wherein said temperature sensor thermistor is disposed within said second opening so as to lie generally in the plane of the peripheral surface of said body member adjacent said second opening.

7. A probe as defined in claim 3 including fluid flow direction sensor means supported by said body member in proximate relation to said velocity sensor means, said direction sensor means being being electrically connected to said conductor means.

8. A probe as defined in claim 7 wherein each of said direction, velocity and temperature sensor means comprises a single thermistor, and including means on said body member electrically insulating said direction sensor thermistor from the fluid being measured.

9. A probe as defined in claim 8 including means on said body member sealing said body member adjacent said second opening so as to prevent fluid from entering said longitudinally extending passage.

10. A probe as defined in claim 8 wherein said velocity sensor thermistor is supported approximately 1 to 2 mm. outwardly from said body open end portion, and said direction sensor thermistor is supported less than 0.5 mm. from said velocity thermistor.

11. A probe as defined in claim 8 wherein said velocity, temperature and direction sensor thermistors are generally spherical having diameters of approximately 0.005 inch.